US012163759B2

(12) United States Patent
Lincoln

(10) Patent No.: US 12,163,759 B2
(45) Date of Patent: Dec. 10, 2024

(54) MAGNETIC PROJECTILE LAUNCHING SYSTEM

(71) Applicant: James Lincoln, Frederick, MD (US)

(72) Inventor: James Lincoln, Frederick, MD (US)

( * ) Notice: Subject to any disclaimer, the term of this patent is extended or adjusted under 35 U.S.C. 154(b) by 104 days.

(21) Appl. No.: 18/179,752

(22) Filed: Mar. 7, 2023

(65) Prior Publication Data

US 2023/0375302 A1 Nov. 23, 2023

Related U.S. Application Data

(60) Provisional application No. 63/364,887, filed on May 18, 2022.

(51) Int. Cl.
*F41B 6/00* (2006.01)
*H01F 7/20* (2006.01)

(52) U.S. Cl.
CPC ............ *F41B 6/003* (2013.01); *H01F 7/202* (2013.01)

(58) Field of Classification Search
CPC .. F41B 6/00; F41B 6/003; F41B 6/006; F41B 3/04
See application file for complete search history.

(56) References Cited

U.S. PATENT DOCUMENTS 811,913 A * 6/1906 Foster, Jr. ................ F41B 6/00 89/8
2,218,164 A * 10/1940 Carpenter .............. A63F 9/143 463/59
2,870,675 A * 1/1959 Salisbury ................. F41B 6/00 89/8
3,613,655 A 1/1971 Tobin et al.
(Continued)

FOREIGN PATENT DOCUMENTS

CH 101197 A 9/1923
CN 1421670 A 6/2003
(Continued)

OTHER PUBLICATIONS

Patil, Electromagnetic Launcher : Review of Various Structures, Sep. 9, 2020.
Aboueljoud, Magnetic Accelerator Cannon Sep. 9, 2020.

*Primary Examiner* — Derrick R Morgan
(74) *Attorney, Agent, or Firm* — Heslin Rothenberg Farley & Mesiti PC

(57) ABSTRACT

A magnetic projectile launching system includes an accelerator having a plurality of electromagnets positioned around a circular accelerator pathway. Each electromagnet includes a frame supporting a core having a passageway surrounding the pathway. A conductive coil is wound around an outer surface of the core. A plurality of capacitors are mounted on the frame and electrically connected to the coil. The capacitors are operable to switch from an on-state to an off-state sequentially to form a moving magnetic field which accelerates a projectile around the pathway. At least one of the electromagnets is a movable electromagnet operable to be moved from a first position to a second position. When the movable electromagnet is in the first position, the accelerator is operable to accelerate the projectile around the pathway. When the movable electromagnet is in the second position, the accelerator is operable to launch the projectile tangentially from the pathway.

20 Claims, 5 Drawing Sheets

(56) References Cited

U.S. PATENT DOCUMENTS

| | | | | | |
|---|---|---|---|---|---|
| 3,613,499 | A * | 10/1971 | Hubbard | F41B 6/00 89/14.05 |
| 4,319,168 | A * | 3/1982 | Kemeny | F41B 6/006 104/282 |
| 4,709,883 | A | 12/1987 | Giuliani et al. | |
| 4,791,850 | A | 12/1988 | Minovitch | |
| 4,796,511 | A | 1/1989 | Eyssa | |
| 4,913,030 | A | 4/1990 | Reynolds | |
| 4,922,800 | A | 5/1990 | Hoffman | |
| 5,024,137 | A | 6/1991 | Schroeder | |
| 5,158,291 | A * | 10/1992 | Biagi | F41B 6/00 273/127 R |
| 5,168,118 | A * | 12/1992 | Schroeder | F41B 6/00 318/135 |
| 5,189,244 | A | 2/1993 | Weldon | |
| 5,699,779 | A * | 12/1997 | Tidman | F41B 3/04 124/1 |
| 5,950,608 | A * | 9/1999 | Tidman | F41B 3/04 124/1 |
| 6,712,055 | B1 * | 3/2004 | Tidman | F41B 3/04 124/1 |
| 7,614,393 | B1 | 11/2009 | Lu | |
| 7,950,379 | B2 * | 5/2011 | Tidman | F41B 3/04 124/56 |
| 9,341,435 | B1 | 5/2016 | Mansfield | |
| 10,669,046 | B2 | 6/2020 | Palmer et al. | |
| 10,926,893 | B2 | 2/2021 | West | |
| 2017/0122696 | A1 * | 5/2017 | Noonan | F41B 6/00 |
| 2018/0347936 | A1 * | 12/2018 | Hartman | F41B 6/003 |
| 2021/0148670 | A1 * | 5/2021 | Busch | H05H 7/22 |

FOREIGN PATENT DOCUMENTS

| | | | |
|---|---|---|---|
| CN | 202209908 | | 5/2012 |
| CN | 102914213 | | 2/2013 |
| CN | 103267447 | | 8/2013 |
| CN | 105180714 | | 12/2015 |
| CN | 110440636 | | 11/2019 |
| CN | 110645829 | | 1/2020 |
| CN | 110686560 | | 1/2020 |
| CN | 111801543 | A | 10/2020 |
| CN | 215447591 | | 1/2022 |
| DE | 4009693 | | 10/1991 |
| DE | 4017170 | | 12/1991 |
| DE | 4225233 | | 2/1994 |
| GB | 2396685 | | 6/2004 |
| KR | 101584757 | | 1/2016 |
| WO | 2006088584 | A2 | 8/2006 |

* cited by examiner

MAGNETIC PROJECTILE LAUNCHING SYSTEM

CROSS REFERENCE TO RELATED APPLICATIONS

This application is a non-provisional of, and claims the benefit of the filing date of, U.S. provisional application 63/364,887, filed May 18, 2022, entitled, "MAGNETIC PROJECTILE LAUNCHING SYSTEM," the contents of which are incorporated herein by reference in their entirety.

TECHNICAL FIELD

The present disclosure relates to projectile launching systems. More specifically, the disclosure relates to magnetic projectile launching systems.

BACKGROUND

A launching system, such as a coil-gun or a Gauss rifle, is a type of mass driver system that includes one or more coils used as electromagnets in the configuration of a linear motor that accelerates a ferromagnetic or conducting projectile to a launching velocity. However, the launching velocity of such launching systems are limited by the length of the system pathway that the electromagnets must be positioned over and that the projectile must pass through. This is because the projectile stops accelerating once it makes a single pass through the system pathway and exits the launching system. Moreover, the launching velocity may be severely limited if the length of the system pathway is limited by the length of external physical constraints that encompass the launching system. Examples of such external physical constraints would be the size or length of the housing or building that the launching system must be positioned in.

Accordingly, there is a need for a launching system that can allow for a system pathway that is longer than the lengths of external physical constraints encompassing the launching system. Additionally, there is a need for a launching system that would allow for the projectile to take multiple passes through a single system pathway.

BRIEF DESCRIPTION

The present disclosure offers advantages and alternatives over the prior art by providing a magnetic launching system with a closed accelerator pathway that enables a projectile to continuously accelerate through multiple passes of the accelerator pathway. In one example, the closed accelerator pathway is a circular accelerator pathway that enables a projectile to accelerate through multiple revolutions around the accelerator pathway before being launched through a launching pathway that extends tangentially from the accelerator pathway.

An example of a magnetic projectile launching system in accordance with one or more aspects of the present disclosure includes an accelerator having a plurality of electromagnets positioned around a closed accelerator pathway of a projectile. Each electromagnet includes a frame supporting a hollow core. The core has a through passageway positioned around the accelerator pathway. A conductive coil is wound around an outer surface of the core. A plurality of capacitors is mounted on the frame and electrically connected to the coil. Each capacitor is operable to conduct a current through the coil to switch on a magnetic field of the electromagnet. The magnetic fields of the electromagnets are operable to sequentially switch through the plurality of electromagnets in one or more revolutions around the accelerator pathway and to accelerate a projectile through one or more revolutions around the accelerator pathway. The plurality of electromagnets includes at least one movable electromagnet that is operable to be moved between a first position and a second position. When the at least one movable electromagnet is in the first position, the accelerator is operable to accelerate the projectile around the accelerator pathway. When the at least one movable electromagnet is in the second position, the accelerator is operable to launch the projectile along a launch pathway that extends tangentially from the accelerator pathway and through the passageway of the at least one movable electromagnet.

Another example of a magnetic projectile launching system in accordance with one or more aspects of the present disclosure includes an accelerator having a plurality of electromagnets positioned around a circular accelerator pathway of a projectile. Each electromagnet includes a frame supporting a hollow core having a through passageway surrounding the accelerator pathway. A conductive coil is wound around an outer surface of the core. A plurality of capacitors is mounted on the frame and electrically connected to the coil. The capacitors of the plurality of capacitors on each of the plurality of electromagnets are operable to switch from an off-state to an on-state sequentially to form a magnetic field. The magnetic field is operable to move sequentially through each electromagnet and to accelerate a projectile around the accelerator pathway. The plurality of electromagnets includes at least one movable electromagnet operable to be moved between a first position and a second position. When the at least one movable electromagnet is in the first position, the accelerator is operable to accelerate the projectile around the accelerator pathway. When the at least one movable electromagnet is in the second position, the accelerator is operable to launch the projectile along a launch pathway that extends tangentially from the accelerator pathway and through the passageway of the at least one movable electromagnet.

In some examples of the projectile launching system, when a capacitor of the plurality of capacitors on an electromagnet is in an off-state, the capacitor is operable to be charged to a predetermined voltage. When the capacitor is in an on-state, the capacitor is operable to discharge the first voltage to conduct the current through the coil to produce the magnetic field of the electromagnet.

In some examples of the projectile launching system, the predetermined voltage is 1000 volts or higher.

In some examples of the projectile launching system, one capacitor in the plurality of capacitors on an electromagnet is switched to an on-state for each revolution of the projectile around the accelerator pathway.

In some examples of the projectile launching system, each capacitor in the plurality of capacitors on an electromagnet is switched to an on-state sequentially for each revolution of the projectile around the accelerator pathway.

In some examples of the projectile launching system, when the at least one movable electromagnet is in its second position, a center of the passageway of the at least one movable electromagnet is closer to the launch pathway than when the at least one movable electromagnet is in its first position.

In some examples of the projectile launching system, when the at least one movable electromagnet is in its first position, the accelerator pathway passes centrally through the passageway of the at least one movable electromagnet.

When the at least one movable electromagnet is in its second position, the launch pathway passes centrally through the passageway of the at least one movable electromagnet.

In some examples of the projectile launching system, the at least one movable electromagnet includes first and a second movable electromagnets each having respective first and second positions. When the first and second movable electromagnets are in their respective first positions, the accelerator pathway passes centrally through the passageways of the first and second movable electromagnets. When the first and second movable electromagnets are in their respective second positions, the first and second electromagnets are spaced further apart relative to their first positions in order to form a gap therebetween. Also, when the first and second movable electromagnets are in their respective second positions, the launch pathway passes through the passageway of the first movable electromagnet and through the gap formed between the first and second movable electromagnets.

In some examples of the projectile launching system, the first and second movable electromagnets move in opposing directions along the accelerator pathway when they move from their respective first positions to their respective second positions.

In some examples of the projectile launching system, a linear mass driver is included. The linear mass driver includes at least one launching electromagnet positioned around the launch pathway of the projectile. The at least one launching electromagnet includes a frame supporting a hollow core. The core has a through passageway positioned around the launch pathway. A conductive coil is wound around an outer surface of the core. At least one capacitor is mounted on the frame and electrically connected to the coil. The at least one capacitor is operable to conduct a current through the coil to switch on a magnetic field of the launching electromagnet. The magnetic field of the at least one launching electromagnet is operable to switch the magnetic field of the launching electromagnet on when the projectile is launched along the launch pathway tangentially from the accelerator pathway.

In some examples of the projectile launching system, the at least one launching electromagnet includes a plurality of launching electromagnets positioned around the launch pathway. Each launching electromagnet includes a frame supporting a hollow core. The core has a through passageway positioned around the launch pathway. A conductive coil is wound around an outer surface of the core. At least one capacitor is mounted on the frame and electrically connected to the coil. The at least one capacitor is operable to conduct a current through the coil to switch on a magnetic field of the launching electromagnet. The magnetic fields of the launching electromagnets are operable to sequentially switch through the plurality of launching electromagnets as the projectile passes through the passageways of the plurality of launching electromagnets.

In some examples of the projectile launching system, the plurality of electromagnets positioned around the accelerator pathway is 12 or greater.

In some examples of the projectile launching system, the plurality of electromagnets positioned around the accelerator pathway is 24 or greater.

It should be appreciated that all combinations of the foregoing concepts and additional concepts discussed in greater detail below (provided such concepts are not mutually inconsistent) are contemplated as being part of the inventive subject matter disclosed herein and may be used to achieve the benefits and advantages described herein.

DRAWINGS

The disclosure will be more fully understood from the following detailed description taken in conjunction with the accompanying drawings, in which.

DETAILED DESCRIPTION

Certain examples will now be described to provide an overall understanding of the principles of the structure, function, manufacture, and use of the methods, systems, and devices disclosed herein. One or more examples are illustrated in the accompanying drawings. Those skilled in the art will understand that the methods, systems, and devices specifically described herein and illustrated in the accompanying drawings are non-limiting examples and that the scope of the present disclosure is defined solely by the claims. The features illustrated or described in connection with one example maybe combined with the features of other examples. Such modifications and variations are intended to be included within the scope of the present disclosure.

The terms "significantly", "substantially", "approximately", "about", "relatively," or other such similar terms that may be used throughout this disclosure, including the claims, are used to describe and account for small fluctuations, such as due to variations in processing from a reference or parameter. Such small fluctuations include a zero fluctuation from the reference or parameter as well. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Figure 1:
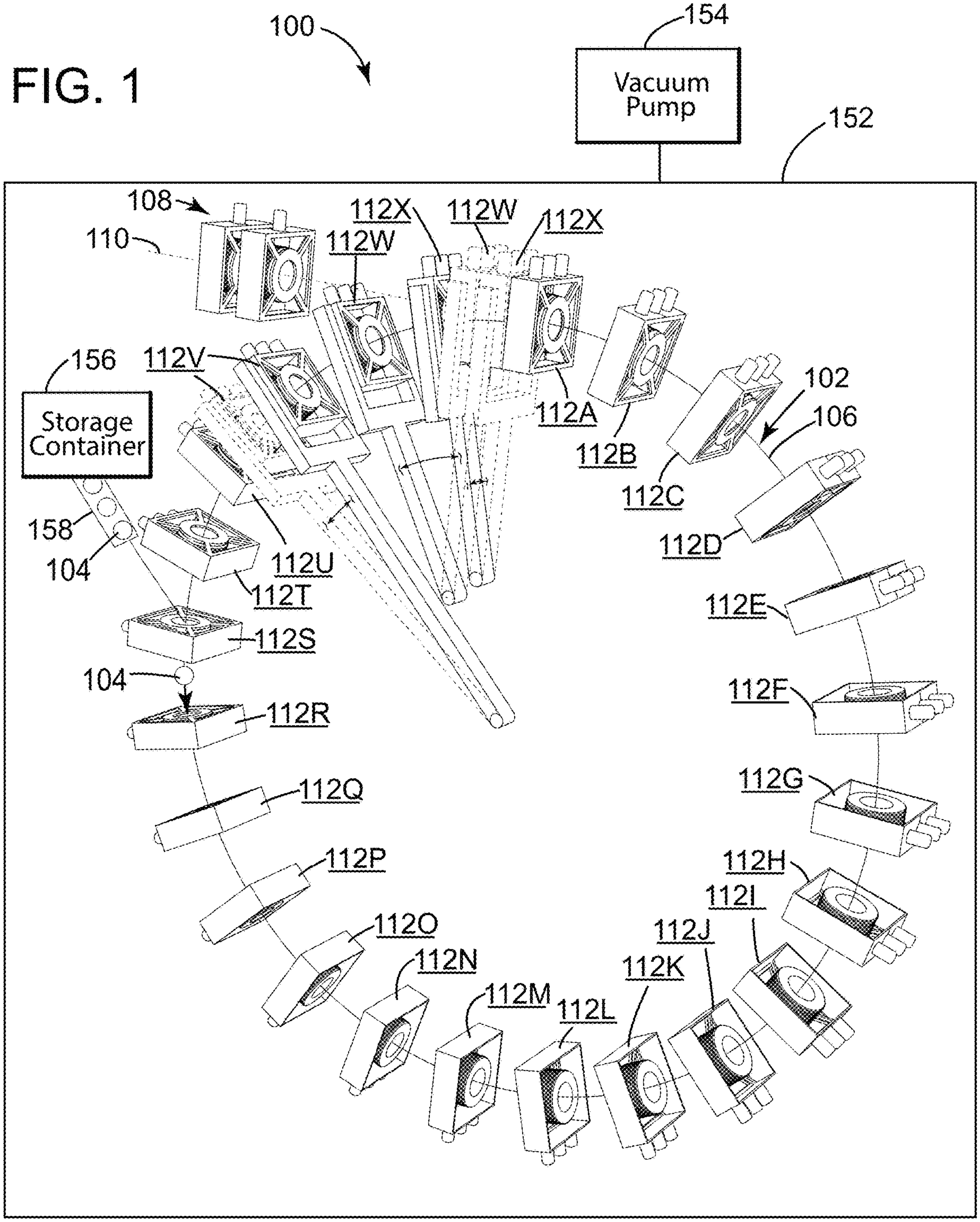
FIG. 1 depicts an example of a perspective view of a magnetic projectile launching system having a circular accelerator pathway passing through a plurality of electromagnets, wherein three of the electromagnets are movable electromagnets that are disposed in a first position, according to aspects described herein.
Figure 2:
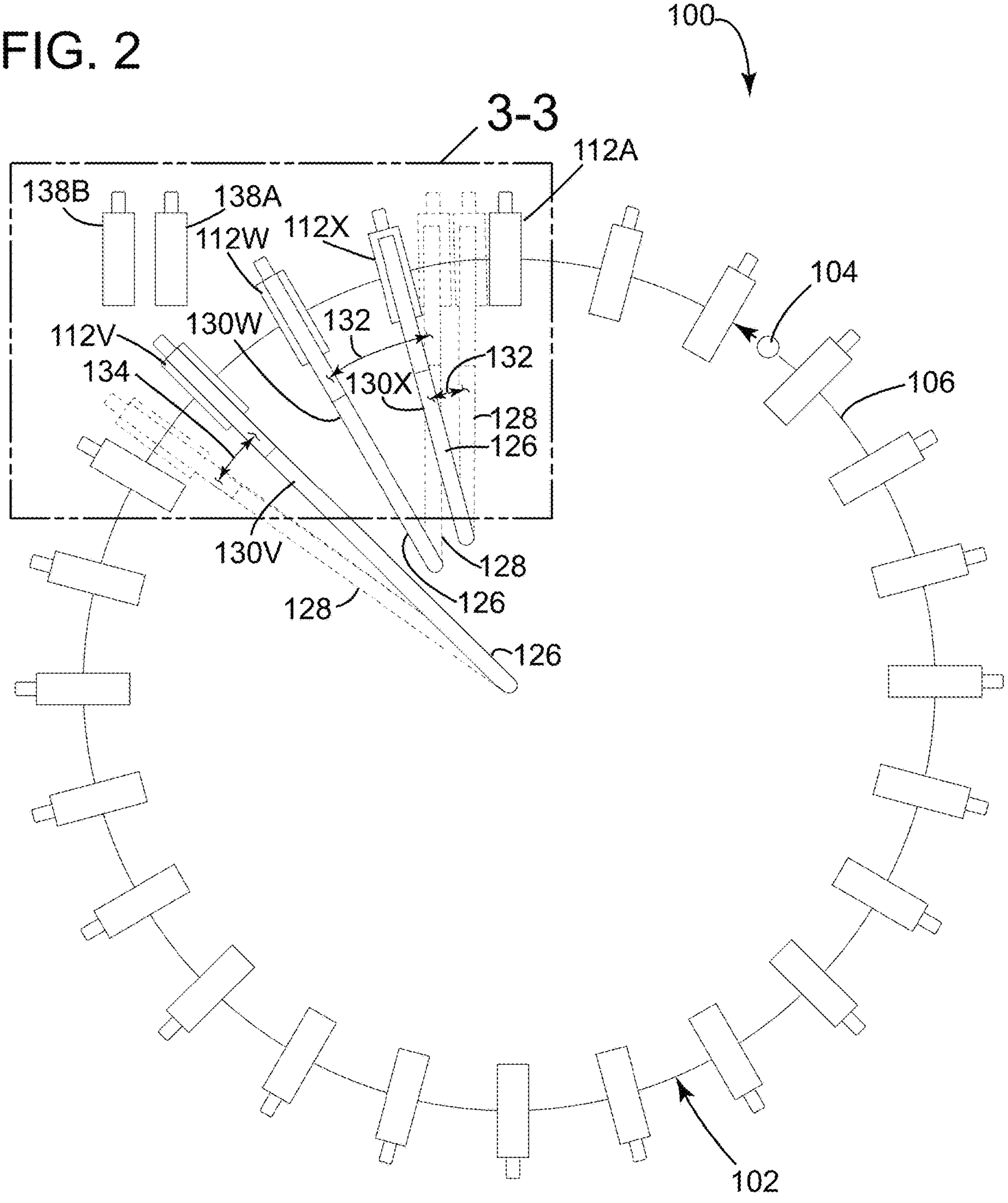
FIG. 2 depicts an example of a side view of the magnetic projectile launching system of FIG. 1, according to aspects described herein.
Figure 3:
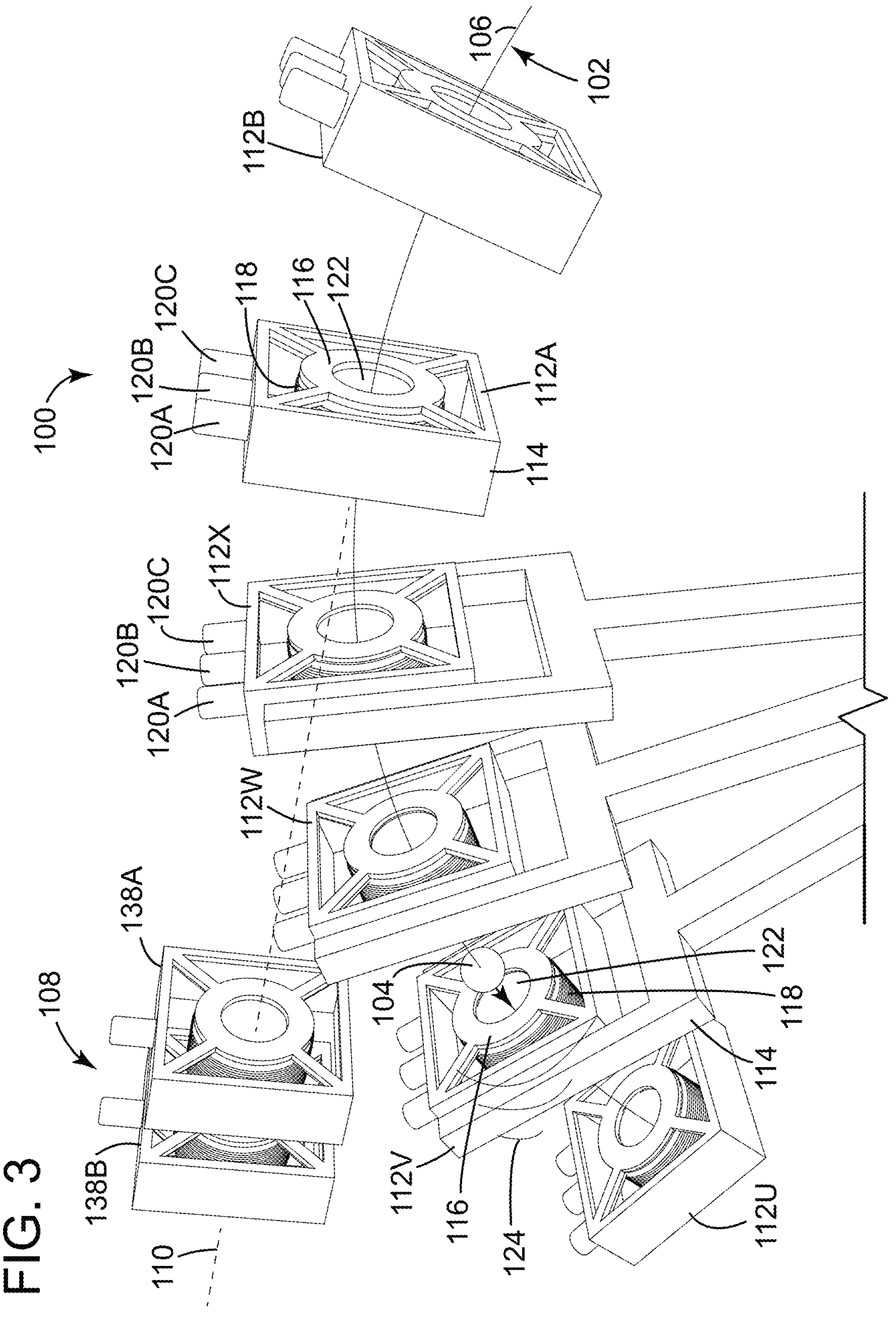
FIG. 3 depicts an example of an enlarged perspective view of the area 3-3 of FIG. 2, according to aspects described herein.

Referring to FIGS. 1, 2 and 3, an example is depicted of a perspective side view (FIG. 1) of a magnetic projectile launching system 100, an example of a side view (FIG. 2) of the magnetic launching system 100 and an example of an enlarged view (FIG. 3) of the area 3-3 of FIG. 2, according to aspects described herein. The magnetic launching system 100 includes an accelerator 102 for electromagnetically accelerating a projectile 104 (such as a circular metal ball or BB) around a closed (in this example circular) accelerator pathway 106. The launching system also includes a linear mass driver 108 for launching the projectile along a launch pathway 110 that extends tangentially from the accelerator pathway 106.

The accelerator 102 includes a plurality of 24 electromagnets 112A, 112B, 112C, 112D, 112E, 112F, 112G, 112H, 112I, 112J, 112K, 112L, 112M, 112N, 112O, 112P, 112Q, 112R, 112S, 112T, 112U, 112V, 112W and 112X (also referred to as 112A-112X and referred to generally as 112) positioned around the closed accelerator pathway 106 of the projectile 104. Each electromagnet 112, of the plurality of electromagnets 112A-112X, includes a frame 114 (see FIG. 3), a core 116 (see FIG. 3), a conductive coil 118 (see FIG. 3) and a plurality of capacitors 120A, 120B and 120C (also referred to as 120A-120C and referred to generally as 120) (see FIG. 3). Herein, the capacitors 120A, 120B and 120C on any one electromagnet 112 will be referred to as first capacitor 120A, second capacitor 120B and third capacitor 120C for that particular electromagnet 112. The frame 114 of each electromagnet 112 supports the hollow core 116. The core 116 has a through passageway 122 positioned around the accelerator pathway 106. The conductive coil 118 is wound around an outer surface of the core 116. The plurality of capacitors 120A-12C are mounted on the frame and are electrically connected to the coil 118.

Each capacitor 120 is operable to switch back and forth between an “off-state” and an “on-state.” When a capacitor 120 of the plurality of capacitors 120A-120C on any electromagnet 112 of the plurality of electromagnets 120A-120X is in an off-state, the capacitor 120 is operable to be charged to a predetermined first voltage. The first voltage may be 1000 volts, 2000 volts, 5000 volts or higher. When the capacitor 120 is in an on-state, the capacitor 120 is operable to discharge the first voltage to conduct a current through the coil 118 to produce a magnetic field 124 (see FIG. 3) of the electromagnet 112. The magnetic field 124 of an electromagnet 112, therefore, may be switched on and off rapidly by switching a capacitor 120 mounted on the electromagnet 112 between its on-state and its off-state. Also, by sequentially switching between capacitors 120 mounted on adjacent electromagnets 120, the projectile 104 may be drawn magnetically though the passageways 122 of each electromagnet 120A-120X and around the accelerator pathway 106.

Basically, the capacitors 120 are turned on and off in a precisely timed sequence causing the projectile 104 to be accelerated quickly along the accelerator pathway via the magnetic field 124 switching sequentially from one electromagnet 112 to the next. Accordingly, the magnetic fields 124 of the electromagnets 112 are operable to sequentially switch through the plurality of electromagnets 112A-112X in one or more revolutions around the accelerator pathway 106 and to accelerate the projectile 104 through one or more revolutions around the accelerator pathway 106. Advantageously, the closed accelerator pathway 106 is not limited in length since a projectile can be accelerated through multiple revolutions to reach its ultimate launching velocity.

In other words, the capacitors 120 of the plurality of capacitors 120A-120C on each of the plurality of electromagnets 112A-112X are operable to switch from an off-state to an on-state sequentially to form the magnetic field 124. The magnetic field 124 is operable to move sequentially through each electromagnet 112 and to accelerate the projectile 104 around the accelerator pathway 106.

In the example of the magnetic launching system 100 illustrated in FIGS. 1 and 2, one capacitor 120 in the plurality of capacitors 120A-12B mounted on an electromagnet 112 is switched to an on-state for each revolution of the projectile 104 around the accelerator pathway 106. For example, each first capacitor 120A of each electromagnet 112A-112X may be sequentially switched on and off for the first full revolution of the projectile 104 around the entire accelerator pathway 106. Then each second capacitor 120B of each electromagnet 112A-112X may be sequentially switched on and off for the second full revolution of the projectile 104 around the entire accelerator pathway 106. Next, Then each third capacitor 120C of each electromagnet 112A-112X may be sequentially switched on and off for the third full revolution of the projectile 104 around the entire accelerator pathway 106. At that point, the projectile may have reached its final launching velocity and be ready to launch.

Accordingly, in the example of the magnetic launching system 100 illustrated in FIGS. 1 and 2, each capacitor 120 in the plurality of capacitors 120A-12C on any electromagnet 112 is switched to an on-state and then to an off-state sequentially for each revolution of the projectile 104 around the accelerator pathway 106. That is, for the first revolution of the projectile 104 around accelerator pathway 106, first capacitor 120A of electromagnet 112A will switch on and off. Then for the second revolution of the projectile 104 around accelerator pathway 106, second capacitor 120B of electromagnet 112A will switch on and off. Next, for the third revolution of the projectile 104 around accelerator pathway 106, third capacitor 120C of electromagnet 112A will switch on and off.

In the example of the magnetic launching system 100 illustrated in FIGS. 1 and 2, there are a plurality of 24 electromagnets 112A-112X arranged around a circular accelerator pathway 106. However, any number of electromagnets may be used to direct a projectile 104 around a closed accelerator pathway that is not necessarily circular. For example, there may be 4, 6, 12, 24 or more electromagnets. Additionally, the closed path may be more polygonal or oblong in shape than circular. Alternatively, depending on the positioning of the electromagnets 112, the closed path may not be completely symmetrical.

Also in the example of the magnetic launching system 100 illustrated in FIGS. 1 and 2, the plurality of capacitors 120 mounted on the frame is a plurality of three. However, any number of two or more capacitors may be used to accelerate a projectile 104 multiple revolutions around the closed accelerator pathway 106. For example, there may be a plurality of 2, 3, 4, 6 or more capacitors.

The plurality of electromagnets 112A-112X includes at least one movable electromagnet that is advantageously used to enable the projectile 104 to transition from the closed accelerator pathway 106 to a launch pathway 110. In the example illustrated herein, the magnetic launching system 100 includes three movable electromagnets 112V, 112W and 112X. However, any number of one or more movable electromagnets 112 may be used to enable the transition from the accelerator pathway 106 to the launch pathway 110.

The movable electromagnets 112V, 112W, 112X are operable to be moved between a first position 126 (see FIG. 2) and a second position 128 (see FIG. 2). When the movable electromagnets are in the first position 126, the accelerator 102 is operable to accelerate the projectile 104 around the accelerator pathway 106. When the movable electromagnets 112V, 112W, 112X are in the second position 128, the accelerator 102 is operable to launch the projectile 104 along a launch pathway 110 that extends tangentially from the accelerator pathway 106.

If there was not at least one movable electromagnet, such as electromagnets 112V-112X, then the projectile 104 may crash into the frame 114 of an electromagnet 112 that is adjacent to the electromagnet 112 that the projectile 104 is being launched from. In the example illustrated herein of launching system 100, the projectile 104 is rotated counter-clockwise around the accelerator pathway 106 and is designed to be launched tangentially from electromagnet 112A, which is at the 12 O'clock position on the launching system 100. However, if none of the electromagnets 112V-112X adjacent to electromagnet 112A were movable, then the tangential trajectory of the projectile 104 would crash into the frames 114 of one or more of those adjacent electromagnets 112V-112X rather than pass through their passageways 122 or miss the electromagnets all together.

Advantageously, by designing electromagnets 112V-112X to be movable, the passageways 122 of those electromagnets 112V-112X can be aligned with the launch pathway 110 (as is the case with electromagnets 112Y and 112X) or the electromagnet can be moved entirely out of the way of the launch pathway 110 (as is the case with electromagnet 112V). This is accomplished by having movable electromagnets 112V, 112W and 112X each attached to pivot arms 130V, 130W and 130X (see FIG. 2) respectively. Accordingly, when movable electromagnets 112W and 112X are pivoted (as indicated by directional arrows 132 (see FIG. 2)) via pivot arms 130W and 130X from their first positions 126 to their second positions 128, movable electromagnets 112W and 112X move along the accelerator pathway 106 toward electromagnet 112A and more closely align the center of their passageways 122 with the launch pathway 110 of the projectile 104. By contrast, when movable electromagnet 112V is pivoted (as indicated by directional arrow 134) via pivot arm 130V from its first position 126 to its second position 128, electromagnet 112V moves in an opposing direction along the accelerator pathway 106 relative to that of adjacent movable electromagnets 112W and 112X to move electromagnet 112V entirely out of the way of the launch pathway.

Though in the movable electromagnets 112V-112X are illustrated herein is being moveable via pivot arms 130V-130X, other structures and methods may be used to move the electromagnets. For example, the electromagnets 112V-112X may be made to move along a track (not shown) back and forth between their first positions and their second positions.

Figure 4:
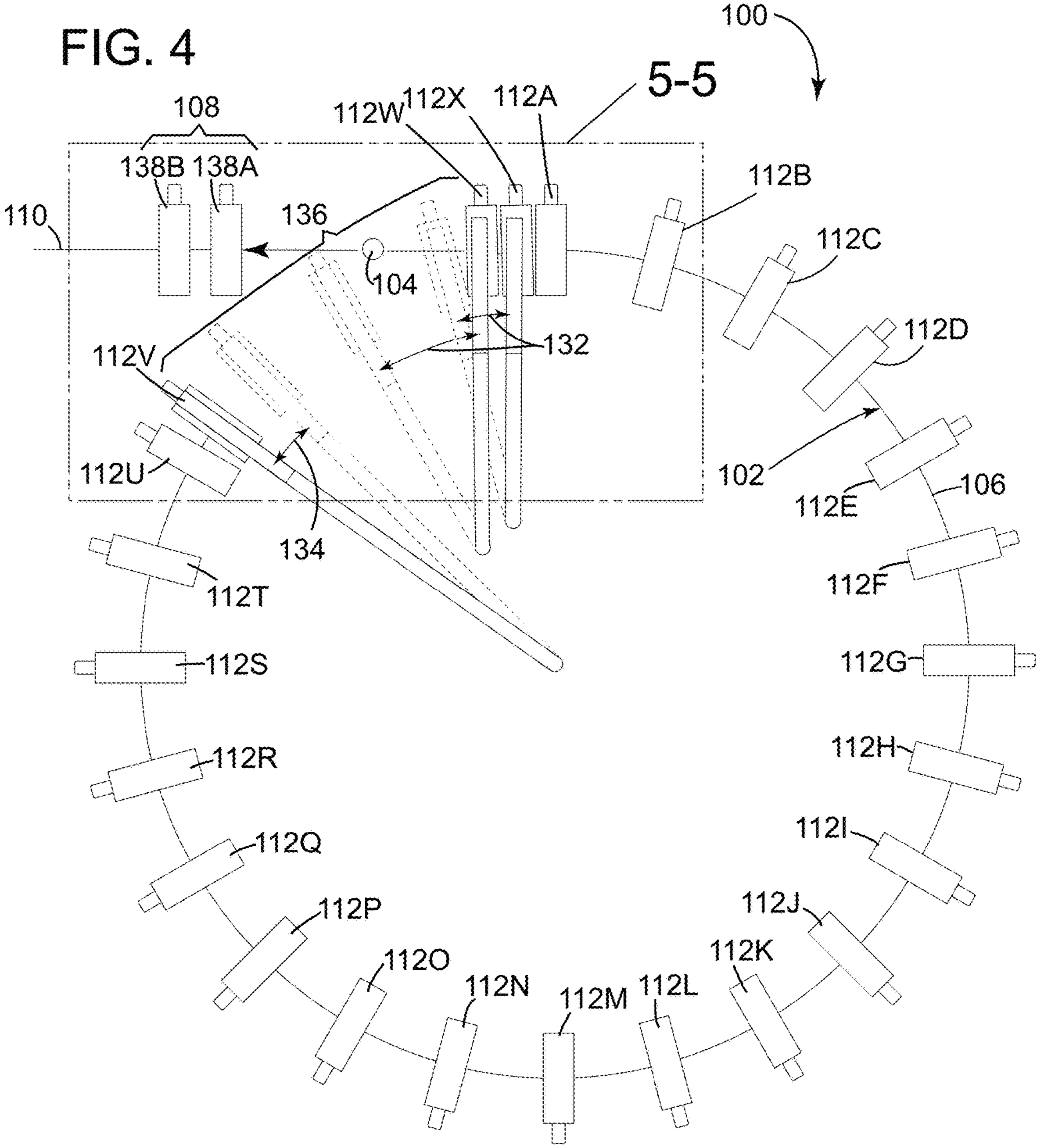
FIG. 4 depicts an example of a side view of the magnetic projectile launching system of FIG. 1 having the three movable electromagnets positioned in a second position, according to aspects described herein.

Referring to FIG. 4, an example is depicted of a side view of the magnetic projectile launching system 100 having the three movable electromagnets 112V-112X disposed in their respective second positions 128, according to aspects described herein. By comparing movable electromagnets 112W and 112X in their second positions 128 (see FIG. 4) to that of the same movable electromagnets 112W and 112X in their first positions 126 (see FIG. 2), it can be seen that, when the movable electromagnets 112W and 112X are in their second position 128, the centers of the passageways 122 of the movable electromagnets 112W and 112X are closer to the launch pathway 110 than when the movable electromagnets 112W and 112X are in their first positions 126.

Additionally, when the movable electromagnets 112W, 112X are in their first position 126, the accelerator pathway 106 passes centrally through the passageways 122 of the movable electromagnets 112W, 112X. By contrast, when the movable electromagnets 112W, 112X are in their second position 128, the launch pathway 110 passes centrally through the passageways 122 of the movable electromagnet 112W, 112X. Accordingly, the second positions 128 of movable electromagnets 112W, 112X enables the projectile 104 to pass through the passageways 122 of movable electromagnets 112W, 112X as the projectile 104 is launched from the accelerator 102.

Also, by comparing the first positions 126 (see FIGS. 1 and 2) to the second positions 128 (see FIG. 4) of adjacent movable electromagnets 112V and 112W, it can be seen that, when the movable electromagnets 112V, 112W are in their respective first positions 126, the accelerator pathway 106 passes centrally through the passageways 122 of the movable electromagnets 112V and 112W. However, when the movable electromagnets 112V, 112W are in their respective second positions 128, the movable electromagnets 112V, 112W are spaced further apart relative to their first positions 126 in order to form a gap 136 (see FIG. 4) therebetween.

Accordingly, when the movable electromagnets 112V, 112W are in their respective second positions 128, the launch pathway 110 passes through the passageway 122 of movable electromagnet 112W and through the gap 136 formed between the movable electromagnets 112V and 112W. Accordingly, the second positions 128 of movable electromagnets 112V, 112W enables the projectile 104 to pass through the passageway 122 of movable electromagnet 112W and to entirely miss movable electromagnet 112V as the projectile 104 is launched from the accelerator 102.

Figure 5:
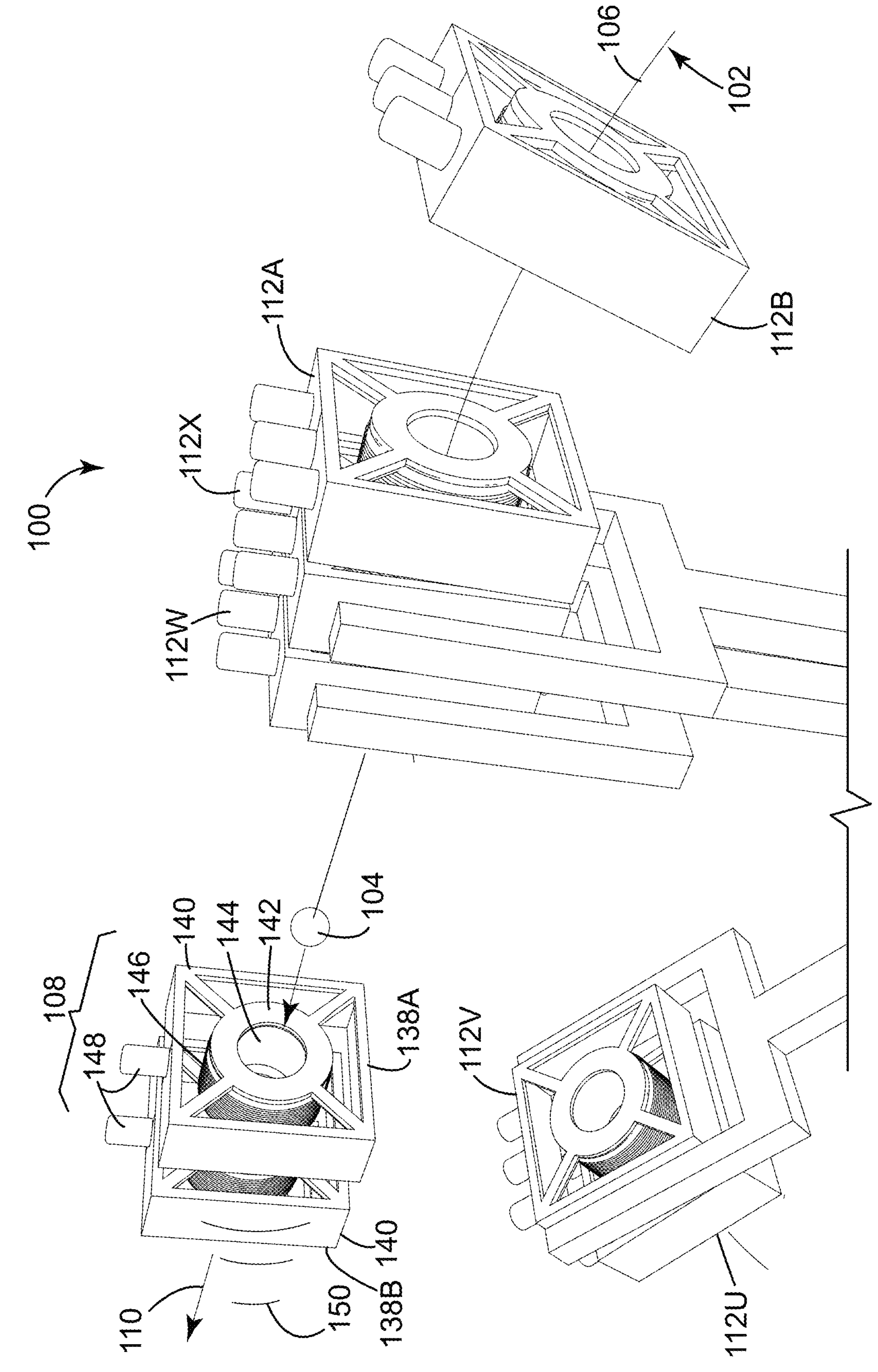
FIG. 5 depicts an example of an enlarged perspective view of the area 5-5 of FIG. 4, according to aspects described herein.

Referring to FIG. 5, an example is depicted of an enlarged perspective view of the area 5-5 of FIG. 4, according to aspects described herein. The linear mass driver 108 of the magnetic projectile launching system 100 has the launch pathway 110 extending tangentially from the accelerator pathway 106 and through the linear mass driver 108. The function of the linear mass driver 108 is to divert the projectile 104 from the accelerator 102 and to magnetically guide the projectile 104 along the launch pathway 110, when the projectile 104 has reached its launch velocity within the accelerator 102.

The linear mass driver 108 includes at least one launching electromagnet 138 positioned around the launch pathway 110 of the projectile 104. In the example illustrated in FIG. 5, there are two launching electromagnets 138A and 138B, however any number of one or more launching electromagnets 138 may be used.

The launching electromagnets 138 have a similar structure to that of the electromagnets 112 of the accelerator 102. More specifically, the launching electromagnets 138 include a frame 140 supporting a hollow core 142. The core 142 of the launching electromagnet 138 has a through passageway 144 positioned around the launch pathway 110. A conductive coil 146 is wound around an outer surface of the core 142.

At least one capacitor 148 is mounted on the frame 140 and electrically connected to the coil 146. The capacitor 148 is operable to conduct a current through the coil 146 to switch on a magnetic field 150 of the one or more launching electromagnets 138A, 138B. Though the example in FIG. 5 illustrates a single capacitor 148 for each launching electromagnet 138A, 138B, any number of capacitors may be used. Like the electromagnets 112A-112X of the accelerator 102, the launching electromagnets 138A, 138B may be high voltage electromagnets and may be operable to store 1000 Volts, 2000 Volts, 5000 Volts or more.

The magnetic field 150 of the at least one launching electromagnet 138 is operable to be switched on when the projectile 104 is launched along the launch pathway 110 tangentially from the accelerator pathway 106. The magnetic field 150 pulls the projectile 104 along the launch pathway 110 and the magnetic field is switched off as the projectile 104 passes through the passageway 122 of the launching electromagnet 138.

When there are a plurality of launching electromagnets 138, such as when there are two electromagnets 138A and 138B, the capacitors 138 of each launching electromagnet 138 are switched on sequentially, which in turn switches the magnetic fields 150 of the launching electromagnets 138 on and off sequentially to pull the projectile 104 through the passageways 122 of the launching electromagnets 138. In other words, when there are a plurality of launching electromagnets 138, the magnetic fields 150 of the launching electromagnets 138 are operable to sequentially switch through the plurality of launching electromagnets 138A, 138B as the projectile 104 passes through the passageways 122 of the plurality of launching electromagnets 138A, 138B.

Advantageously, the magnetic projectile launching system 100 may accelerate a projectile any number of revolutions around the accelerator 102 to attain very high launching velocities without regard to the length of the launching system 100. Additionally, the movable magnets 112V-112X and the linear mass driver 108 enable the projectile to be launched tangentially from the accelerator pathway 106 without crashing into any of the electromagnets 112.

Referring to FIG. 1 again, the magnetic projectile launching system 100 may be operated in a vacuum to reduce friction on the projectile 104. For example, the launching system 100 may be housed in a housing 152 and a vacuum may be pulled on the interior of the housing 152 with a vacuum pump 154.

Alternatively, the magnetic projectile launching system 100 may be disposed in outer space in orbit around the earth. In space the launching system 100 would be subjected to the ultra-low vacuum of space, as well as the ultra-low gravity of space to further enhance the performance of the launching system 100.

The projectiles 104 may be fed into the accelerator 102 through any number of methods and/or structures. For example, the projectiles 104 may be housed in a projectile storage container 156 and fed into the accelerator 102 between the electromagnets 112 via a projectile feeding tube 158.

It should be appreciated that all combinations of the foregoing concepts and additional concepts discussed in greater detail herein (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

Although the invention has been described by reference to specific examples, it should be understood that numerous changes may be made within the spirit and scope of the inventive concepts described. Accordingly, it is intended that the disclosure not be limited to the described examples, but that it have the full scope defined by the language of the following claims.

What is claimed is:

1. A magnetic projectile launching system comprising:

an accelerator having a plurality of electromagnets positioned around a closed accelerator pathway of a projectile, each electromagnet comprising:

a frame supporting a hollow core, the core having a through passageway positioned around the accelerator pathway, a conductive coil wound around an outer surface of the core, and a plurality of capacitors mounted on the frame and electrically connected to the coil, each capacitor being operable to conduct a current through the coil to switch on a magnetic field of the electromagnet;

wherein the magnetic fields of the electromagnets are operable to sequentially switch through the plurality of electromagnets in one or more revolutions around the accelerator pathway and to accelerate a projectile through one or more revolutions around the accelerator pathway; and wherein the plurality of electromagnets includes at least one movable electromagnet operable to be moved between a first position and a second position, wherein, when the at least one movable electromagnet is in the first position, the accelerator is operable to accelerate the projectile around the accelerator pathway and, when the at least one movable electromagnet is in the second position, the accelerator is operable to launch the projectile along a launch pathway that extends tangentially from the accelerator pathway.

2. The magnetic projectile launching system of claim 1, wherein:

when a capacitor of the plurality of capacitors on an electromagnet is in an off-state, the capacitor is operable to be charged to a predetermined first voltage; and when the capacitor is in an on-state, the capacitor is operable to discharge the predetermined first voltage to conduct the current through the coil to produce the magnetic field of the electromagnet.

3. The magnetic projectile launching system of claim 2, wherein the predetermined voltage is 1000 volts or higher.

4. The magnetic projectile launching system of claim 2, wherein one capacitor in the plurality of capacitors on an electromagnet is switched to an on-state for each revolution of the projectile around the accelerator pathway.

5. The magnetic projectile launching system of claim 2, wherein each capacitor in the plurality of capacitors on an electromagnet is switched to an on-state sequentially for each revolution of the projectile around the accelerator pathway.

6. The magnetic projectile launching system of claim 1, wherein, when the at least one movable electromagnet is in its second position, a center of the passageway of the at least one movable electromagnet is closer to the launch pathway than when the at least one movable electromagnet is in its first position.

7. The magnetic projectile launching system of claim 1, wherein, when the at least one movable electromagnet is in its first position, the accelerator pathway passes centrally through the passageway of the at least one movable electromagnet and, when the at least one movable electromagnet is in its second position, the launch pathway passes centrally through the passageway of the at least one movable electromagnet.

8. The magnetic launching system of claim 1, wherein:

the at least one movable electromagnet comprises adjacent first and a second movable electromagnets each having respective first and second positions;

wherein, when the first and second movable electromagnets are in their respective first positions, the accelerator pathway passes centrally through the passageways of the first and second movable electromagnets;

wherein, when the first and second movable electromagnets are in their respective second positions, the first and second electromagnets are spaced further apart relative to their first positions in order to form a gap therebetween; and wherein, when the first and second movable electromagnets are in their respective second positions, the launch pathway passes through the passageway of the first movable electromagnet and through the gap formed between the first and second movable electromagnets.

9. The magnetic launching system of claim 8, wherein the first and second movable electromagnets move in opposing directions along the accelerator pathway when they move from their respective first positions to their respective second positions.

10. The magnetic launching system of claim 1, comprising:

a linear mass driver comprising at least one launching electromagnet positioned around the launch pathway of the projectile, the at least one launching electromagnet comprising:

a frame supporting a hollow core, the core having a through passageway positioned around the launch pathway, a conductive coil wound around an outer surface of the core, and at least one capacitor mounted on the frame and electrically connected to the coil, the at least one capacitor being operable to conduct a current through the coil to switch on a magnetic field of the launching electromagnet;

wherein the magnetic field of the at least one launching electromagnet is operable to be switched on when the projectile is launched along the launch pathway tangentially from the accelerator pathway.

11. The magnetic launching system of claim 10, comprising:

the at least one launching electromagnet comprising a plurality of launching electromagnets positioned around the launch pathway; each launching electromagnet comprising:

a frame supporting a hollow core, the core having a through passageway positioned around the launch pathway, a conductive coil wound around an outer surface of the core, and at least one capacitor mounted on the frame and electrically connected to the coil, the at least one capacitor being operable to conduct a current through the coil to switch on a magnetic field of the launching electromagnet;

wherein the magnetic fields of the launching electromagnets are operable to sequentially switch through the plurality of launching electromagnets as the projectile passes through the passageways of the plurality of launching electromagnets.

12. The magnetic launching system of claim 1, wherein the plurality of electromagnets positioned around the accelerator pathway is 12 or greater.

13. The magnetic launching system of claim 12, wherein the plurality of electromagnets positioned around the accelerator pathway is 24 or greater.

14. A magnetic projectile launching system comprising:

an accelerator having a plurality of electromagnets positioned around a circular accelerator pathway of a projectile, each electromagnet comprising:

a frame supporting a hollow core having a through passageway surrounding the accelerator pathway, a conductive coil wound around an outer surface of the core, and a plurality of capacitors mounted on the frame and electrically connected to the coil;

wherein the capacitors of the plurality of capacitors on each of the plurality of electromagnets are operable to switch from an off-state to an on-state sequentially to form a magnetic field, wherein the magnetic field is operable to move sequentially through each electromagnet and to accelerate a projectile around the accelerator pathway; and wherein the plurality of electromagnets includes at least one movable electromagnet operable to be moved between a first position and a second position, wherein, when the at least one movable electromagnet is in the first position, the accelerator is operable to accelerate the projectile around the accelerator pathway and, when the at least one movable electromagnet is in the second position, the accelerator is operable to launch the projectile along a launch pathway that extends tangentially from the accelerator pathway.

15. The magnetic projectile launching system of claim 14, wherein, when the at least one movable electromagnet is in its second position, a center of the passageway of the at least one movable electromagnet is closer to the launch pathway than when the at least one movable electromagnet is in its first position.

16. The magnetic projectile launching system of claim 14, wherein, when the at least one movable electromagnet is in its first position, the accelerator pathway passes centrally through the passageway of the at least one movable electromagnet and, when the at least one movable electromagnet is in its second position, the launch pathway passes centrally through the passageway of the at least one movable electromagnet.

17. The magnetic launching system of claim 14, wherein:

the at least one movable electromagnet comprises adjacent first and a second movable electromagnets each having respective first and second positions;

wherein, when the first and second movable electromagnets are in their respective first positions, the accelerator pathway passes centrally through the passageways of the first and second movable electromagnets;

wherein, when the first and second movable electromagnets are in their respective second positions, the first and second electromagnets are spaced further apart relative to their first positions in order to form a gap therebetween; and wherein, when the first and second movable electromagnets are in their respective second positions, the launch pathway passes through the passageway of the first movable electromagnet and through the gap formed between the first and second movable electromagnets.

18. The magnetic launching system of claim 17, wherein the first and second movable electromagnets move in opposing directions along the accelerator pathway when they move from their respective first positions to their respective second positions.

19. The magnetic launching system of claim 14, comprising:

a linear mass driver comprising at least one launching electromagnet positioned around the launch pathway of the projectile, the at least one launching electromagnet comprising:

a frame supporting a hollow core, the core having a through passageway positioned around the launch pathway, a conductive coil wound around an outer surface of the core, and at least one capacitor mounted on the frame and electrically connected to the coil, the at least one capacitor being operable to conduct a current through the coil to switch on a magnetic field of the at least one launching electromagnet;

wherein the magnetic field of the at least one launching electromagnet is operable to be switched on when the projectile is launched along the launch pathway tangentially from the accelerator pathway.

20. The magnetic launching system of claim 19, comprising:

the at least one launching electromagnet comprising a plurality of launching electromagnets positioned around the launch pathway, each launching electromagnet of the plurality of electromagnets comprising:

a frame supporting a hollow core, the core having a through passageway positioned around the launch pathway, a conductive coil wound around an outer surface of the core, and at least one capacitor mounted on the frame and electrically connected to the coil, the at least one capacitor being operable to conduct a current through the coil to switch on a magnetic field of the launching electromagnet;

wherein the magnetic fields of the plurality of launching electromagnets are operable to sequentially switch through the plurality of launching electromagnets as the projectile passes through the passageways of the plurality of launching electromagnets.

* * * * *